(12) United States Patent
Nolan et al.

(10) Patent No.: US 9,454,404 B2
(45) Date of Patent: Sep. 27, 2016

(54) METHOD, APPARATUS, AND SOFTWARE FOR IDENTIFYING A SET OF OPTIONS FOR THE PROVISION OF A SERVICE

(75) Inventors: Paul T. Nolan, Winchester (GB); Christopher E. Sharp, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1885 days.

(21) Appl. No.: 12/426,345

(22) Filed: Apr. 20, 2009

(65) Prior Publication Data

US 2009/0265469 A1 Oct. 22, 2009

(30) Foreign Application Priority Data

Apr. 21, 2008 (EP) .................................. 08154886

(51) Int. Cl.
*G06F 15/173* (2006.01)
*G06F 9/50* (2006.01)

(52) U.S. Cl.
CPC ............ *G06F 9/5055* (2013.01); *Y02B 60/142* (2013.01)

(58) Field of Classification Search
CPC ........................ G06F 6/5005; Y02B 60/142
USPC ............................................. 709/226; 726/1
See application file for complete search history.

(56) References Cited

U.S. PATENT DOCUMENTS

| | | | |
|---|---|---|---|
| 2006/0230432 A1* | 10/2006 | Lee et al. ..................... | 726/1 |
| 2006/0242101 A1 | 10/2006 | Akkiraju | |
| 2007/0067384 A1 | 3/2007 | Angelov | |
| 2007/0067421 A1 | 3/2007 | Angelov | |
| 2007/0130520 A1* | 6/2007 | Skunberg et al. ............ | 715/700 |
| 2008/0013724 A1* | 1/2008 | Shamoon et al. ............ | 380/201 |
| 2008/0244693 A1* | 10/2008 | Chang .......................... | 726/1 |

OTHER PUBLICATIONS

Bajaj et al., "Web Services Policy Framework (WS-Policy)", Sep. 2004, Internet: xmlsoap.org, p. 1-22.*
A. Anderson, "Web services policies," in IEEE Security & Privacy, vol. 4, No. 3, pp. 84-87, May-Jun. 2006.*
R. M. Bahati, M. A. Bauer and E. M. Vieira, "Adaptation Strategies in Policy-Driven Autonomic Management," Autonomic and Autonomous Systems, 2007. ICAS07. Third International Conference on, Athens, 2007, pp. 16-16.*
B. Del-Fabbro, D. Laiymani, J. M. Nicod and L. Philippe, "Data management in grid applications providers," First International Conference on Distributed Frameworks for Multimedia Applications, 2005, pp. 315-322.*

* cited by examiner

*Primary Examiner* — Taylor Elfervig
(74) *Attorney, Agent, or Firm* — Steven M. Greenberg, Esq.; CRGO LAW

(57) ABSTRACT

A method, apparatus and software is disclosed in which options for the provision of a service are each identified by an option identifier for use in determining the applicable options for a given service request.

29 Claims, 6 Drawing Sheets

| Policy 1 | |
|---|---|
| Alternative 1 | QOS Option 1 |
| | Security Option 1 |
| | Transport Protocol Option 1 |
| Alternative 2 | QOS Option 2 |
| | Security Option 3 |
| | Transport Protocol Option 1 |
| Alternative 3 | QOS Option 1 |
| | Security Option 2 |
| | Transport Protocol Option 2 |

Figure 3

| Alternatives Code Table | |
|---|---|
| Code 1 | Alternative 1 |
| Code 2 | Alternative 2 |
| Code 3 | Alternative 3 |

Figure 4

METHOD, APPARATUS, AND SOFTWARE FOR IDENTIFYING A SET OF OPTIONS FOR THE PROVISION OF A SERVICE

FIELD OF THE INVENTION

The present invention relates to a method, apparatus, or software for identifying a set of options for the provision of a service.

BACKGROUND OF THE INVENTION

In networked computer systems, services are commonly provided by service providers to service consumers or requestors. The interaction between service providers and requestors is governed by a protocol, such as the Web Service protocol defined by the World Wide Web Consortium (W3C). Such protocols provide for policies that detail the allowed configurations of a service, that is, the technical requirements of interactions between the service provider and service requesters. Policies may define features or elements such as the required security, quality of service, or transport protocol that are either required or preferred in a service interaction. Thus, the requester of a service can obtain the relevant provider's policy and specify their service requests in accordance with the policy.

However, one problem is that not all combinations of alternative policy features or elements may be valid. In addition, to determine the alternative features selected by a requester may require analysis of the request messages, which uses significant processing power. Furthermore such message analysis may not always provide a definitive indication of the alternative policy elements being used by the requester.

SUMMARY OF THE INVENTION

An embodiment of the invention provides a method for identifying a set of options for the provision of a service, the method comprising: a) providing a set of options for the provision of a service by service provision logic; b) assigning an option identifier to each option in the set of options; c) providing means for determining the identifier assigned to a given option so as to enable a service requestor to include the appropriate identifier in a request for the service; d) in response to a request received from a requester relating to the service, identifying an option identifier in the request and determining whether the received identified option identifier corresponds to one of the option identifiers assigned to the set of options; and e) if the received option identifier corresponds to one of the option identifiers assigned to the set of options then identifying the received request with the corresponding option.

The method may further comprise providing the received request to the service provision logic with an indication of the corresponding option. If the received option identifier does not correspond to any of the option identifiers assigned to the set of options then the received request may be rejected. Each option may comprise a set of elements each having an element identifier and each option identifier for a given option is derived from a combination of the corresponding elements identifiers for the option. Each element identifier may be encoded in the combination. Each element identifier may be encoded using a hash function. The element identifiers may be combined together to provide the corresponding option identifier. The element identifiers may be combined using an XOR function.

The method by which the option codes are determined may be identified to service requesters so as to enable independent determination of the code for inclusion in service requests by the service requesters. The option identifiers may be provided to service requesters for direct inclusion in service requests by the service requesters. The options may be policy options for the service. The options may be defined in the policy as alternatives. An encoding algorithm for the option identifiers may be declared in the policy. The service may be a web service. The policy may be a WS-policy. The option identifiers may be QNames.

Another embodiment provides an apparatus for identifying a set of options for the provision of a service, the apparatus being operable to: provide a set of options for the provision of a service by service provision logic; assign an option identifier to each option in the set of options; provide means for determining the identifier assigned to a given option so as to enable a service requestor to include the appropriate identifier in a request for the service; in response to a request received from a requester relating to the service, identify an option identifier in the request and determine whether the received identified option identifier corresponds to one of the option identifiers assigned to the set of options; and if the received option identifier corresponds to one of the option identifiers assigned to the set of options then identify the received request with the corresponding option.

A further embodiment provides a group of one or more programs arranged to enable a group of one or more programmable devices to perform a method for identifying a set of options for the provision of a service, the method comprising: a) providing a set of options for the provision of a service by service provision logic; b) assigning an option identifier to each option in the set of options; c) providing means for determining the identifier assigned to a given option so as to enable a service requester to include the appropriate identifier in a request for the service; d) in response to a request received from a requester relating to the service, identifying an option identifier in the request and determining whether the received identified option identifier corresponds to one of the option identifiers assigned to the set of options; and e) if the received option identifier corresponds to one of the option identifiers assigned to the set of options then identifying the received request with the corresponding option.

Another embodiment provides a group of one or more programs arranged to enable a group of one or more programmable devices to provide apparatus for identifying a set of options for the provision of a service, the apparatus being operable to: provide a set of options for the provision of a service by service provision logic; assign an option identifier to each option in the set of options; provide means for determining the identifier assigned to a given option so as to enable a service requester to include the appropriate identifier in a request for the service; in response to a request received from a requester relating to the service, identify an option identifier in the request and determine whether the received identified option identifier corresponds to one of the option identifiers assigned to the set of options; and if the received option identifier corresponds to one of the option identifiers assigned to the set of options then identify the received request with the corresponding option.

BRIEF DESCRIPTION OF THE DRAWINGS

Embodiments of the invention will now be described, by way of example only, with reference to the accompanying drawings.

FIG. 3 is a table showing a service provision policy for the service provider of FIG. 2.

FIG. 4 is a table of policy alternative identifiers for the policy alternatives in the policy of FIG. 3.

DETAILED DESCRIPTION OF THE INVENTION

Figure 1:
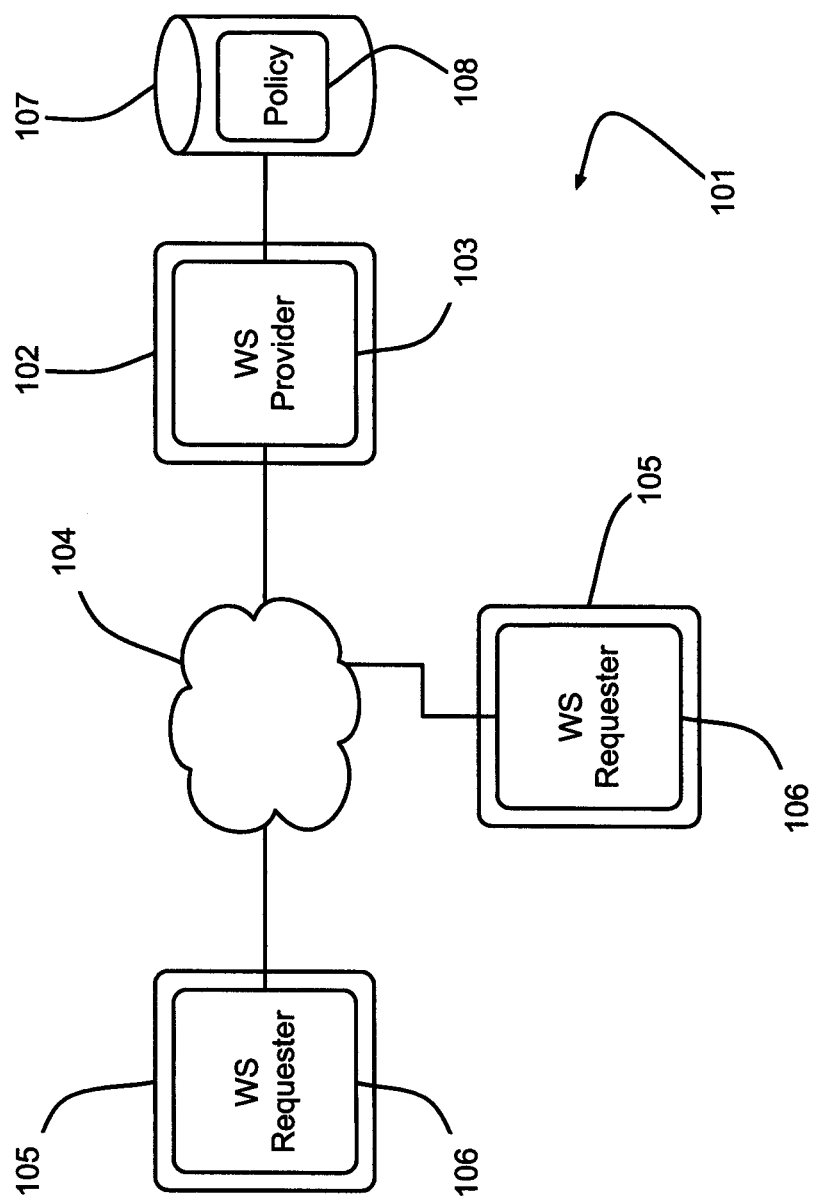
FIG. 1 is a schematic illustration of a computer system arranged to provide a web service.

With reference to FIG. 1, a computer system 101 comprises a first computer 102 arranged to run a service provider application program in the form of a web service provider application program 103. The first computer 102 is connected, via a wide area network (WAN) 104, to two further computers 105. Each of the further computers 105 is arranged to run a service requester application program in the form of a web service requester application program 106. The first computer 102 is also connected to a storage device 107 on which a web service policy 108 is stored. The web service provider 103 is arranged to provide a service over the network 104 in response to requests from the web service requesters 106. The policy 108 defines security, quality of service or transport protocol options that are available for use in interactions between the web service provider and requesters 103, 106. The allowable sets of elements or assertions in the policy are referred to herein as policy alternatives. In other words, a policy alternative is a policy option.

Figure 2:
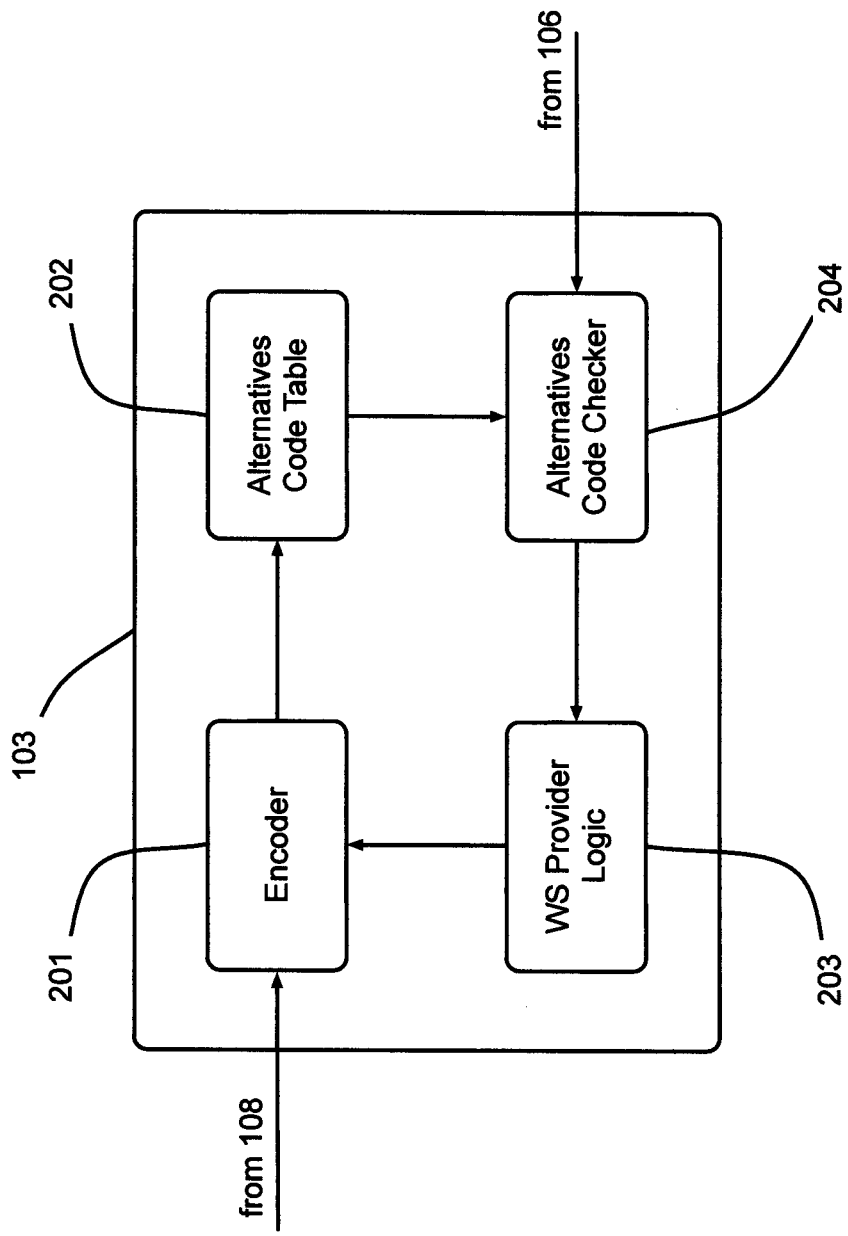
FIG. 2 is schematic illustration of functional elements of a web service provider in the computer system of FIG. 1.

FIG. 2 shows the web service provider 103 in further detail. The web service provider 103 comprises an encoder 201, an alternatives code table 202, web service provider logic 203 and an alternatives code checker 204. The encoder 201 is arranged to identify each alternative in the policy 108 and to derive a unique code for the alternative using a repeatable algorithm. In the present embodiment, the unique codes are referred to as policy alternative identifiers (PAIDs). The PAIDs for each identified alternative are stored in the alternatives code table 202. Each of the web service requesters 106 are arranged to include the appropriate PAID in each service request made to the web service provider 103. The alternatives code checker 204 is arranged to analyze each incoming web service request and to identify the PAID it contains. The identified PAID is then compared to the alternatives code table 202 to establish firstly that the PAID is valid and, if so, which of the policy alternatives it relates to. This information is then passed to the web service provider logic 203 for use in its processing of the received service request. Thus, the PAID in each service request enables the web service provider 103 to identify the policy alternative in use for a given service request without any need to analyze the request further than identifying the PAID.

FIG. 3 shows the policy 108 in further detail, which in the present embodiment specifies a list of three policy alternatives. Each alternative comprises a different set of policy assertions. Each policy assertion relates to a feature of the interaction between the service provider and requester 103, 106. In the present embodiment, the policy assertions relate to either a quality of service (QOS) feature, a security level feature (Security) or a transport protocol feature. FIG. 4 shows the alternatives code table in further detail showing a PAID for each of the policy alternatives of the policy 108. In the present embodiment, each PAID is derived from the names used to label each policy assertion in the unique set of assertions that comprise a given policy alternative. In the present embodiment, the name of each assertion is encoded using a predetermined hash function in the form of the Secure Hash Algorithm 1 (SHA-1). The hash codes representing each assertion in the alternative are then combined together using an exclusive OR function (XOR) to produce the PAID. Use of an XOR function ensures that the resulting PAID is independent of the order in which the hash codes for the relevant assertions are combined. In the present embodiment, the particular hash function used is declared in the policy 108 so as to enable the service requesters 106 to calculate PAIDs independently based on the policy alternatives they apply to given service requests.

Figure 5:
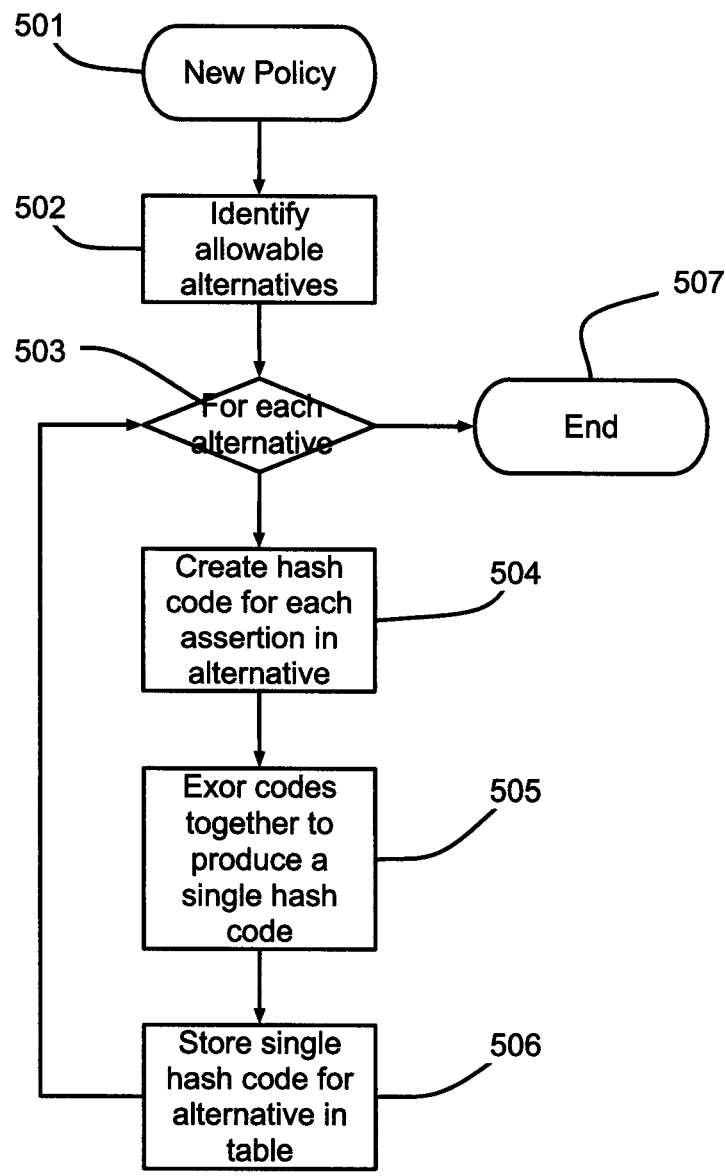
FIG. 5 is a flow chart illustrating processing performed by the service provider of FIG. 2.

The processing performed by the web service provider 103 when calculating the policy alternative codes 202 will now be described in further detail with reference to the flow chart of FIG. 5. At 501, processing is initiated in response to the creation of a new or updated policy 108 and processing moves to 502. At 502, each allowable alternative within the policy is identified and processing moves to 503. At 503, each alternative is taken in turn and processing moves to 504. At 504, the hash function is applied to the name of each assertion within the given alternative and processing moves to 505. At 505, the generated hash codes for each assertion are combined together using an XOR function to produce the PAID for the given alternative and processing moves to 506. At 506, the generated PAID for the given alternative is stored in the alternatives code table. Processing then returns to 503 and proceeds as described above unless, at 503, no further alternatives require processing, in which case, processing moves to 507 and ends.

Figure 6:
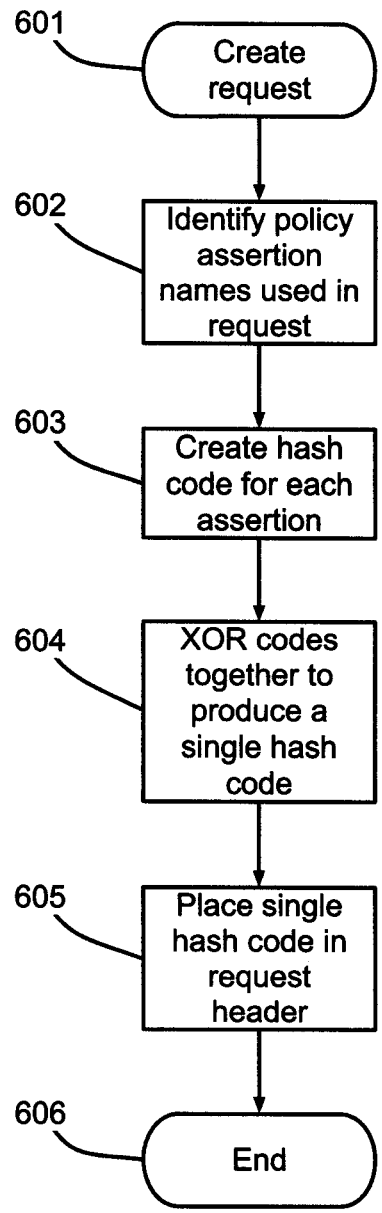
FIG. 6 is a flow chart illustrating processing performed by a service requester of FIG. 1.

The processing performed by the web service requester 103 when calculating the policy alternative codes for use in a service request will now be described in further detail with reference to the flow chart of FIG. 6. At 601, processing is initiated in response to the creation of a service request and processing moves to 602. At 602, the names of the policy assertions used in the service request are identified and processing moves to 603. At 603, the hash function identified in the policy 108 is applied to the name of each assertion within the request and processing moves to 604. At 604, the generated hash codes are combined together using an XOR function to produce the PAID for the request and processing moves to 605. At 605, the generated PAID is inserted in the header for the service request and the request sent to the service provider 103. Processing then moves to 606 and ends.

Figure 7:
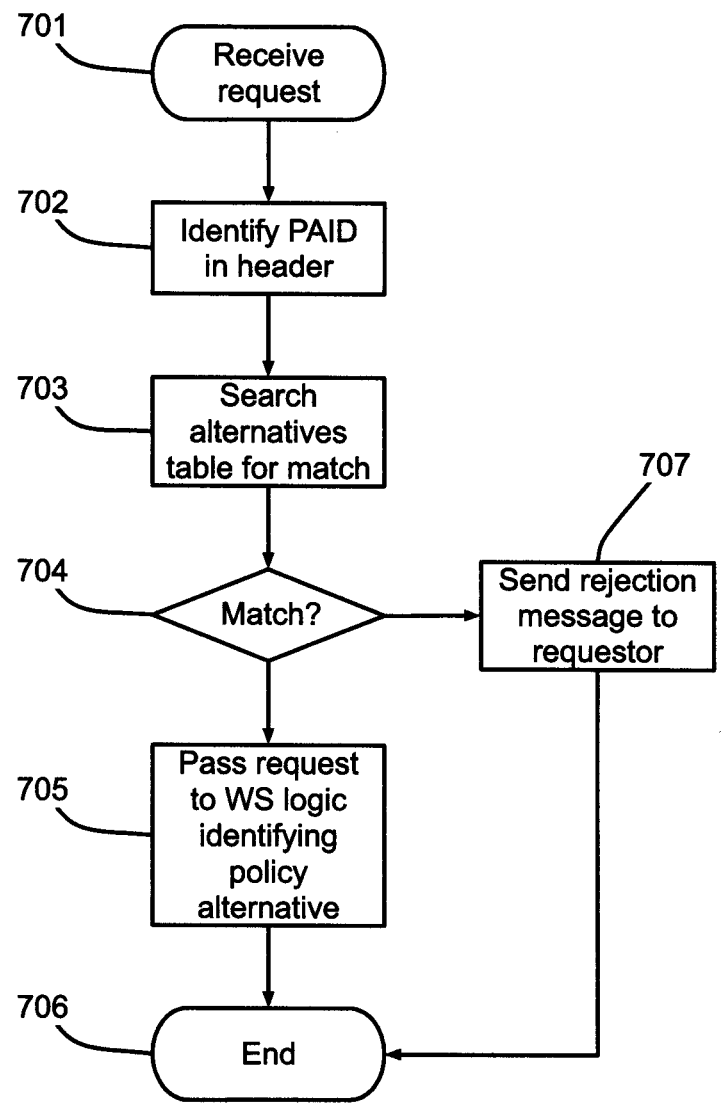
FIG. 7 is a flow chart illustrating further processing performed by the service provider of FIG. 2.

The processing performed by the web service provider 103 when processing a received service request to identify the applicable policy alternative will now be described in further detail with reference to the flow chart of FIG. 7. At 701, processing is initiated in response to the receipt of a service request from a service requester 106 and processing moves to 702. At 702, the PAID in the request header is identified and extracted and processing moves to 703. At 703, the alternatives code table is searched to identify a match with the extracted PAID and processing moves to 704. At 704, if a match has been identified in the table for the extracted PAID then processing moves to 705. At 705, the service request is passed to the web service logic 203 along with an indication of the identified policy alternative in use in the service request. Processing then moves to 706 and ends. If at 704, no match has been identified for the extracted PAID in the alternatives code table then processing moves to 707 where a rejection message is returned to the service requestor 106 identifying the reason for the rejection of the request. Processing then moves to 706 and ends.

In another embodiment, the allowable alternatives for a policy are not explicitly stated in the policy. Instead, either an indication of the allowable alternatives is explicitly provided elsewhere or may be implied from the error messages received from the service provider. In a further embodiment, the PAIDs are published to avoid the need for requesters to calculate the PAIDs independently. The PAIDs may be published in the policy. In another embodiment, the PAIDs are not based on the names of assertions but instead are randomly generated codes. In a further embodiment, all requests are accepted and if no PAID is identified or no match identified between the received PAID and the alternatives code table, no indication of an alternative is provided to service logic.

As will be understood by those in the art, any other suitable encoding method may be employed for creating the PAIDs and any other suitable element or feature of a given assertion may be used as a source from which a given encoding method may produce a PAID. Where applicable, the Qualified Name (QName) used to label assertions in a policy defined in Extensible Mark-up Language (XML) may be used to produce the PAID.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method for identifying a set of options for provision of a Web service between a Web service provider computer system and a Web service requestor computer, the method comprising:
   assigning, by an encoder of the Web service provider computer system, an option identifier to each option in the set of options for the provision of the Web service;
   in response to a request received from the Web service requestor computer relating to the Web service, identifying in an alternative code table in memory of a computer, by an alternative code checker of the Web service provider computer system, an option identifier in the request and also determining, by the alternative code checker of the Web service provider computer system, whether the received identified option identifier corresponds to one of the option identifiers assigned to the set of options; and
   upon determining that the received option identifier corresponds to one of the option identifiers assigned to the set of options, identifying, by the alternative code checker of the Web service provider computer system, the received request with the corresponding option for use when provisioning the Web service in response to the received request by the Web service provision logic of the Web service provider computer system,
   wherein each option of the set of options comprises a set of elements identifying one or more security options, quality of service options, and transport protocol options each having an element identifier, and wherein each option identifier for a given option is derived from a combination of the corresponding element identifiers for the option.

2. The method according to claim 1, further comprising:
   providing the received request to Web service provision logic of the Web service provider computer system with an indication of the corresponding option.

3. The method according to claim 1, further comprising:
   upon determining that the received option identifier does not correspond to any of the option identifiers assigned to the set of options, then rejecting, by the alternative code checker of the Web service provider computer system, the received request.

4. The method according to claim 1, wherein each element identifier is encoded in the combination.

5. The method according to claim 4, wherein each element identifier is encoded using a hash function.

6. The method according to claim 1, wherein the corresponding element identifiers are combined together to provide the corresponding option identifier.

7. The method according to claim 6, wherein the corresponding element identifiers are combined using an XOR function.

8. The method according to claim 1, wherein a specific hash function by which the option identifiers are determined is declared to Web service requesters computers in a policy so as to enable independent determination of the option identifiers for inclusion in requests by the Web service requestors computers related to the Web service.

9. The method according to claim 1, wherein the option identifiers are provided to Web service requestors computers for direct inclusion in requests by the Web service requestors computers related to the Web service.

10. The method according to claim 1, wherein the set of options are policy options for a policy for the Web service.

11. The method according to claim 10, wherein the set of options are defined in the policy as alternatives.

12. The method according to claim 10, wherein an encoding algorithm for the option identifiers is declared in the policy.

13. The method according to any of claim 10, wherein the policy is a WS-policy.

14. The method according to claim 13, wherein the option identifiers are Qnames.

15. An apparatus for identifying a set of options for provision of a Web service between a Web service provider computer system and a Web service requestor computer, the apparatus having a processor being operable to:
   assign, by an encoder of the Web service provider computer system, an option identifier to each option in the set of options for the provision of the Web service;

in response to a request received from the Web requestor computer relating to the Web service, identify in an alternative code table in memory of a computer, by an alternative code checker of the Web service provider computer system, an option identifier in the request and also determine, by the alternative code checker of the Web service provider computer system, whether the received identified option identifier corresponds to one of the option identifiers assigned to the set of options; and upon determining that the received option identifier corresponds to one of the option identifiers assigned to the set of options, identify, by the alternative code checker of the Web service provider computer system, the received request with the corresponding option for use when provisioning the Web service in response to the received request by the Web service provision logic of the Web service provider computer system, wherein each option of the set of options comprises a set of elements identifying one or more security options, quality of service options, and transport protocol options each having an element identifier, and wherein each option identifier for a given option is derived from a combination of the corresponding element identifiers for the option.

16. The apparatus according to claim 15, being further operable to provide the received request to Web service provision logic of the Web service provider computer system with an indication of the corresponding option.

17. The apparatus according to claim 15, being further operable to upon determining that the received option identifier does not correspond to any of the option identifiers assigned to the set of options, reject, by the alternative code checker of the Web service provider computer system, the received request.

18. The apparatus according to claim 15, wherein which each element identifier is encoded in the combination.

19. The apparatus according to claim 18, wherein each element identifier is encoded using a hash function.

20. The apparatus according to claim 15, wherein the corresponding element identifiers are combined together to provide the corresponding option identifier.

21. The apparatus according to claim 20, wherein the corresponding element identifiers are combined using an XOR function.

22. The apparatus according to claim 15, wherein a specific hash function by which the option identifiers are determined is declared to Web service requesters computers in a policy so as to enable independent determination of the option identifiers for inclusion in requests by the Web service requestors computers related to the Web service.

23. The apparatus according to claim 15, wherein the option identifiers are provided to Web service requesters computers for direct inclusion in requests by the Web service requestors computers related to the Web service.

24. The apparatus according to claim 15, wherein the set of options are policy options for a policy for the Web service.

25. The apparatus according to claim 24, wherein the set of options are defined in the policy as alternatives.

26. The apparatus according to claim 24, wherein an encoding algorithm for the option identifiers is declared in the policy.

27. The apparatus according to claim 24, wherein the policy is a WS-policy.

28. The apparatus according to claim 27, wherein the option identifiers are QNames.

29. A non-transitory computer-readable storage medium having stored thereon program code that when executed in a memory of the one or more programmable devices causes the one or more programmable devices to perform a method for identifying a set of options for provision of a Web service between a Web service provider computer system and a Web service requestor computer, the method comprising:

assigning, by an encoder of the Web service provider computer system, an option identifier to each option in the set of options for the provision of the Web service;

in response to a request received from the Web service requestor computer relating to the Web service, identifying in an alternative code table in memory of a computer, by an alternative code checker of the Web service provider computer system, an option identifier in the request and also determining, by the alternative code checker of the Web service provider computer system, whether the received identified option identifier corresponds to one of the option identifiers assigned to the set of options; and upon determining that the received option identifier corresponds to one of the option identifiers assigned to the set of options, identifying, by the alternative code checker of the Web service provider computer system, the received request with the corresponding option for use when provisioning the Web service in response to the received request by the Web service provision logic of the Web service provider computer system, wherein each option of the set of options comprises a set of elements identifying one or more security options, quality of service options, and transport protocol options each having an element identifier, and wherein each option identifier for a given option is derived from a combination of the corresponding element identifiers for the option.

* * * * *